United States Patent

[11] 3,582,060

[72] Inventor Herschel B. Carter
 2033 West Mulberry Drive, Phoenix, Ariz. 85015
[21] Appl. No. 840,175
[22] Filed July 9, 1969
[45] Patented June 1, 1971

[54] CONDUIT-CUTTING TOOL
 8 Claims, 4 Drawing Figs.
[52] U.S. Cl. ................................................. 269/2,
 145/129, 143/86, 269/87.2
[51] Int. Cl. ..................................................... B25b 7/02,
 B25b 3/00
[50] Field of Search ........................................... 81/5.1, 418,
 420; 145/129; 143/86; 30/90.1, 90.2, 286, 289,
 290; 269/2, 87.2, 36, 96, 42, 4, 81, 91

[56] References Cited
UNITED STATES PATENTS

| | | | |
|---|---|---|---|
| 444,778 | 1/1891 | Greenamyer................ | 269/96 |
| 2,969,701 | 1/1961 | Hasenkamp................. | 269/96 |
| 3,284,895 | 11/1966 | Selander et al. ............. | 30/90.2 |

Primary Examiner—Robert C. Riordon
Assistant Examiner—Roscoe V. Parker, Jr.
Attorney—Wm. H. Dean ABSTRACT: A conduit-cutting tool generally comprising pliers having a pair of opposed jaws with slots therein adapted to receive a hacksaw blade therethrough, said jaws being adapted to hold a conduit in position to be cut when said hacksaw blade is reciprocated through said slots; and a brace bar coupled to one jaw of said pliers and adapted to be hooked around a stud or rafter in opposition to the opposite one of said jaws, whereby the pliers may be braced in such a manner that the jaws will be forced together and held steady, while the saw blade is reciprocated through said slots to accurately cut off a conduit between said jaws.

PATENTED JUN 1 1971  3,582,060

INVENTOR.
HERSCHEL B. CARTER
BY
Wm. H. Dean

CONDUIT-CUTTING TOOL

BACKGROUND OF THE INVENTION

Various tubular structures, and especially electrical conduit of the convoluted flexible-type have been cut off to match various fittings, as well as terminal and outlet boxes, during the construction of buildings and/or the installation of electrical equipment therein.

In many instances, the usual convoluted flexible electrical metallic conduit is difficult to cut off accurately so that the cutoff end of said conduit is disposed at a right angle generally to the axis of the conduit in order that the cutoff end will accurately fit into an outlet box or fixture holding the conduit in connection therewith.

The conventional flexible convoluted electrical conduit used by electrical contractors is very difficult to cut accurately so as to provide a cutoff end which is substantially at right angles to the axis of the flexible conduit. Various handtools have been used for this purpose, but in many instances, the cutoff end is so inaccurate and mutilated that electrical inspectors will not pass an installation because of the improperly cutoff end of the conduit where it fits into the usual clamp or fixture structure holding it in connection with panels or outlet boxes.

SUMMARY OF THE INVENTION

The present invention relates to a flexible conduit-cutting tool having pliers provided with opposed jaws for accurately holding a flexible metallic conduit, and wherein the jaws are provided with saw blade guiding slots accurately disposed to guide a saw blade to cut off the conduit at right angles to its axis when clamped between the jaws. The invention also comprising novel plier handle and brace bar structure which may be used to hold the conduit between the jaws securely in relation to a building stud or rafter or other structure while one hand of the operator is utilized to operate a hacksaw through the slots in the jaws of the invention for cutting off the conduit very accurately and without mutilating the end of the conduit.

The invention utilizing a pair of pliers and respective conduit-engaging jaws may be held by one hand of the operator, and by means of a brace bar in connection with one of the jaws, the handles of the pliers may be steadily held while the brace bar is hooked over a stud or a rafter to apply force for steadying the jaws of the invention, while also forcing them together, and thus providing convenience for steadily holding a conduit and accurately cutting it off in various locations, such as those in a building under construction where any stud or rafter structure will serve as a suitable location for accurately cutting off the flexible convoluted electrical conduit which has heretofore been very difficult accurately to cut for fitting to various electrical equipment or fixtures.

Accordingly, it is an object of the present invention to provide a very simple flexible conduit-cutting tool which may be used manually on the job in various locations where structures, such as studs, rafters, or other devices may be used for bracing and clamping a piece of conduit while cutting it off in the tool of the invention.

Another object of the invention is to provide a very simple flexible conduit-cutting tool having very accurate saw-guiding slot structure for insuring the accurate cutting of flexible conduit at substantially right angles to its axis to provide neat ends for properly fitting various clamps or other fixtures in connection with electrical panels and outlet boxes, or the like.

Another object of the invention is to provide a flexible conduit-cutting tool which saves a great amount of time and effort on the part of electricians when installing convoluted flexible conduit.

Another object of the invention is to provide a flexible conduit-cutting tool which is very simple and economical of construction, durable, and which will be very readily useable by electricians or other tradesmen.

Further objects and advantages of the invention may be apparent from the following specification, appended claims, and accompanying drawings:

DESCRIPTION OF THE PREFERRED EMBODIMENTS

Figure 1:
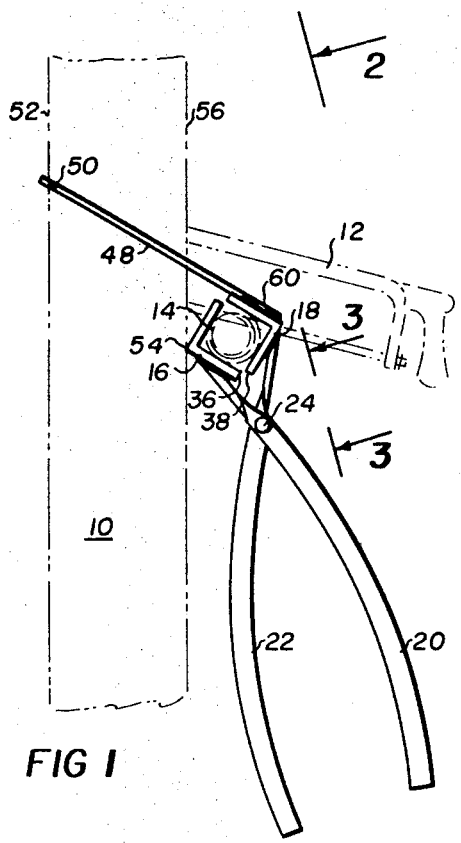
FIG. 1 is a side elevational view of a flexible conduit-cutting tool of the invention shown braced against a building stud, and also showing by broken lines a conventional hacksaw in position to cut a conduit held in the tool of the invention.

As shown in FIG. 1 of the drawings, the flexible conduit-cutting tool of the invention is braced against a stud 10 and a hacksaw 12 is used to cut a conduit 14 disposed between oppositely directed jaws 16 and 18 of the invention. These jaws are generally L-shaped in cross section, as shown in FIG. 1. The jaw 16 being welded or otherwise fixed to a handle 20, while the jaw 18 is welded or otherwise fixed to a handle 22. These handles 20 and 22 are pivoted together by a bolt 24, also shown in FIG. 3 of the drawings.

Figure 2:
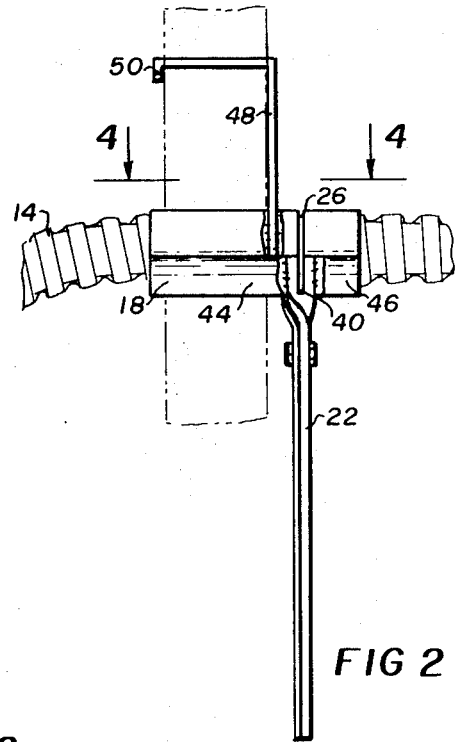
FIG. 2 is a view taken from the line 2-2 of FIG. 1.
Figure 3:
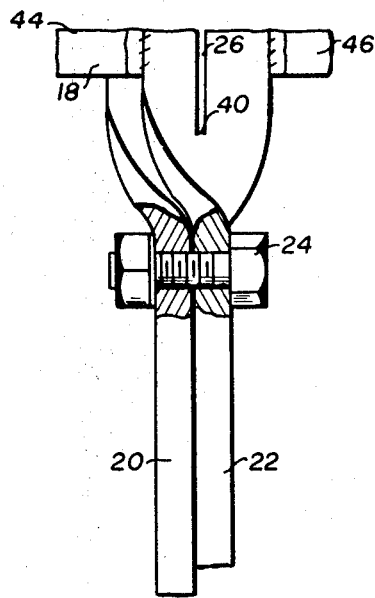
FIG. 3 is an enlarged fragmentary elevational view taken from the line 3-3 of FIG. 1, and showing parts and portions of the invention broken away and in section.
Figure 4:
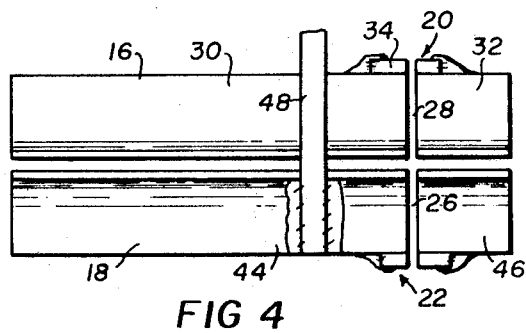
FIG. 4 is an enlarged fragmentary view taken from the line 4-4 of FIG. 2.

The jaws 16 and 18 are elongated, as shown in FIG. 2 of the drawings, and as shown in FIG. 4 of the drawings, the jaw 18 is provided with a saw blade-guiding slot 26 aligned with a similar slot 28 in and extending through the jaw 16. As shown in FIGS. 2 and 3 of the drawings, the slots 26 and 28 extend beyond the extremities of the jaws 16 and 18 in a lateral direction, thereby dividing them into two sections. The jaw 16 having two aligned sections 30 and 32 held together by being welded to an upper end portion 34 of the handle 20. The slot 28, as well as the slot 26, extend downwardly through the respective handles to a position below respective lower edges 36 and 38 of the jaws 16 and 18, as shown in FIG. 1 of the drawings.

As shown in FIG. 2 and FIG. 3 of the drawings, the slot 26 is provided with a lower extremity 40 which extends well down into the handle 22, and this lower extremity of the slot 26 can be seen to overlap the extremities of the jaws 16 and 18. Thus, when a hacksaw blade is reciprocated downward through a conduit 14, as shown in FIG. 1, and the blade progresses down nearly to the extremity 40 of the slot 26 and a similar area of the slot 28, the blade has then passed completely and diametrically through the respective conduit 14 for completely and accurately cutting the conduit into, as shown in FIG. 4 of the drawings, it will be seen that the jaw 18 is provided with aligned sections 44 and 46 similar to the aligned sections 30 and 32 of the jaw 16, and these sections 44 and 46 are welded or otherwise secured to the handle 22 in a similar fashion to the support of the jaw sections 30 and 32 of the jaw 16 by the handle 20.

Welded or otherwise connected to the jaw 18 is a brace bar 48 which is substantially L-shaped, as shown in FIG. 2, and provided with a reverse hook section 50 adapted to hook around a side 52 of a stud 10, while one side 54 of the jaw 16 may be braced against an opposite side 56 of the stud 10. In this manner, the handles 20 and 22 are gripped by one hand of the operator and squeezed together, and both are forced toward the stud 10 so as to cause the brace bar 48 to force the jaws 16 and 18 together, while the hacksaw 12 is reciprocated through the slots 26 and 28 of the jaws 16 and 18 to cut off the conduit 14 at substantially right angles to its axis.

It will be seen that the generally L-shaped brace bar 48 and its hook portion 50 readily adapts it to be engaged with an opposite side of a stud or rafter with respect to the side 54 of the jaw 14, and that the brace bar 48 is welded or otherwise secured to the jaw 18 at 60, thus providing a mechanical arrangement which tends to force the jaws together as the handles 20 and 22 are forced toward the stud or the comparable structure, such as a rafter or the like.

It will be appreciated by those skilled in the art that the use of the tool of the invention will provide for accurately cutting off convoluted flexible electrical conduit in a very accurate manner so as to meet the requirements of the code, and so that electrical inspectors will readily pass installations, wherein the conduit is cut and fit to various structures, such as panels, outlet boxes, and other electrical equipment.

It will be obvious to those skilled in the art that various modifications of the invention may be resorted to without departing from the spirit of the invention.

I claim:

1. In a conduit-cutting tool, the combination of: a pair of manually operable pliers having a pair of respective opposed jaws adapted to engage and clamp oppositely against conduit; said jaws having aligned saw blade-guiding slots therein; said slots extending in a direction and disposition diametrically to overlap the diametrical extremities of a conduit when clamped between said jaws; a pair of handles pivoted together and supporting said pair of jaws so as to pivotally actuate said jaws toward and away from each other, said handles disposed to be manually squeezed together by one hand of a human operator, while the other hand of said operator may reciprocate a saw blade through said slots to cut off said conduit held between said jaws; and a brace bar secured to one of said jaws and including means at its outer end for temporarily securing said tool to a stationary structure for bracing said pliers when said saw blade is used to cut said conduit.

2. The invention, as defined in claim 1, wherein: said brace bar is generally hook-shaped and adapted to hook around one side of a building stud or rafter, while said pliers are engaged with an opposite of said stud or rafter.

3. The invention, as defined in claim 1, wherein: said jaws are generally L-shaped in cross section, and thereby adapted to engage conduit of varying diameters.

4. The invention, as defined in claim 2, wherein: said jaws are generally L-shaped in cross section, and thereby adapted to engage conduit of varying diameters.

5. The invention, as defined in claim 1, wherein: said slots extend through said jaws and into said handles.

6. The invention, as defined in claim 5, wherein: said brace bar is generally hook-shaped and adapted to hook around one side of a building stud or rafter, while said pliers are engaged with an opposite side of said stud or rafter; said jaws being generally L-shaped in cross section, and thereby adapted to engage conduit of varying diameters.

7. The invention, as defined in claim 2, wherein: one jaw of said pliers is adapted to oppose said brace bar in engagement with said stud or rafter.

8. The invention, as defined in claim 7, wherein: the other of said jaws carries said brace bar, such that force on said brace bar engaging a stud or rafter tends to force said jaws together.